US011550394B2

(12) United States Patent
Sarfi et al.

(10) Patent No.: US 11,550,394 B2
(45) Date of Patent: Jan. 10, 2023

(54) FORCE-BASED CONTROL FOR A MOBILE DEVICE HAVING A NON-LINEAR SURFACE

(71) Applicant: LogMeIn, Inc., Boston, MA (US)

(72) Inventors: David Sarfi, Budapest (HU); Istvan Hoffmann, Budapest (HU); Botond Szentannai, Budapest (HU)

(73) Assignee: GoTo Group, Inc., Boston, MA (US)

( * ) Notice: Subject to any disclaimer, the term of this patent is extended or adjusted under 35 U.S.C. 154(b) by 0 days.

(21) Appl. No.: 16/184,127

(22) Filed: Nov. 8, 2018

(65) Prior Publication Data

US 2020/0150763 A1 May 14, 2020

(51) Int. Cl.
*G06F 3/01* (2006.01)
*G06F 1/16* (2006.01)
*G06F 3/0482* (2013.01)

(52) U.S. Cl.
CPC ............ *G06F 3/016* (2013.01); *G06F 1/1626* (2013.01); *G06F 1/1652* (2013.01); *G06F 1/1684* (2013.01); *G06F 3/017* (2013.01); *G06F 3/0482* (2013.01)

(58) Field of Classification Search
CPC ........ G06F 3/016; G06F 1/1684; G06F 3/017; G06F 3/0482; G06F 1/1652; G06F 1/1626; G06F 3/04883; G06F 3/0346; G06F 3/0487
See application file for complete search history.

(56) References Cited

U.S. PATENT DOCUMENTS

| 8,928,546 | B1 | 1/2015 | Vukoszavlyev et al. |
| 9,916,066 | B2 | 3/2018 | Putz et al. |
| 9,916,073 | B1* | 3/2018 | Szeto ................ G06F 3/0414 |
| 10,282,451 | B1* | 5/2019 | Ho .................... G06F 16/909 |
| 2010/0197355 | A1* | 8/2010 | Irie .................... G06F 1/1616 455/566 |
| 2011/0069024 | A1* | 3/2011 | Kim ...................... G06F 3/01 345/173 |
| 2011/0124376 | A1* | 5/2011 | Kim ................... G06F 3/0489 455/566 |
| 2012/0223884 | A1* | 9/2012 | Bi ....................... G06F 3/017 345/158 |
| 2014/0059483 | A1* | 2/2014 | Mairs ................ G06F 3/04817 715/788 |
| 2014/0118271 | A1 | 5/2014 | Lee et al. |
| 2015/0220171 | A1 | 8/2015 | Cho |
| 2015/0355787 | A1* | 12/2015 | Clay ................... G06F 3/0219 715/734 |

(Continued)

*Primary Examiner* — Rodney Amadiz
(74) *Attorney, Agent, or Firm* — David H. Judson

(57) ABSTRACT

A mobile computing device has a display with a curved (i.e. non-linear) surface along one or more edges. The curved surface is force (i.e. pressure) sensitive, such that an amount of pressure applied to the surface at a given point (or a region) of the surface is sensed and adapted to be converted into a control signal. One or more control signals generated by sensing a user's interaction with the curved surface are converted into user interface (UI) operations, such as the opening of one or more applications, application menus, or the like. Preferably, the amount of pressure applied by the user varies, and application of a first pressure generates a first control action, and application of a second pressure greater than the first pressure generates a second control action that is related to the first control action.

10 Claims, 4 Drawing Sheets

(56) References Cited

U.S. PATENT DOCUMENTS

| | | | |
|---|---|---|---|
| 2016/0179338 A1* | 6/2016 | Miller | G06F 3/04817 |
| | | | 345/174 |
| 2016/0265985 A1 | 9/2016 | Onal et al. | |
| 2016/0309017 A1 | 10/2016 | Lee et al. | |
| 2017/0102838 A1* | 4/2017 | Roy | G06F 3/04845 |
| 2018/0224963 A1* | 8/2018 | Lee | G06F 3/0488 |
| 2019/0339804 A1* | 11/2019 | Gleeson | G06F 3/03547 |
| 2020/0150763 A1* | 5/2020 | Sarfi | G06F 3/017 |

\* cited by examiner

If pressed stronger, the menu or any other UI element starts to appear (naturally to the pressure direction).

FORCE-BASED CONTROL FOR A MOBILE DEVICE HAVING A NON-LINEAR SURFACE

BACKGROUND

Technical Field

This disclosure relates generally to mobile devices and, in particular, to techniques that enable force-based control over user interface elements on such devices.

Background of the Related Art

Mobile devices, such as smartphones, tablets and smartwatches, have become ubiquitous in today's society. Faster processors, more memory, higher quality gesture-based multi-touch screens, availability of mobile broadband data, and integration of multi-media and GPS chips along with open interface mobile operating systems, have opened the door for creation of a large variety of mobile applications. Typically, access to the device, and thus to the applications that execute thereon, requires a user to manually enter some user secret, although newer (next-generation) devices enable user access via biometrics, such as fingerprints, facial detection, or the like. While biometric access provides significant advantages in terms of privacy and ease-of use, as these devices (and their associated display screens) become larger, there remains a need to provide new techniques to enable end users to access their devices and applications in a seamless manner.

BRIEF SUMMARY

A mobile computing device has a display with a curved (i.e. non-linear) surface along one or more edges. The curved surface is force (i.e. pressure) sensitive, such that an amount of pressure applied to the surface at a given point (or a region) of the surface is sensed and adapted to be converted into a control signal. One or more control signals generated by sensing a user's interaction with the curved surface are converted into user interface (UI) operations, such as the opening of one or more applications, application menus, or the like. Preferably, the amount of pressure applied by the user varies, and application of a first pressure generates a first control action, and application of a second pressure greater than the first pressure generates a second control action that is related to the first control action. In one embodiment, the first control action is the opening of a given menu, and the second control action is the opening of a sub-menu associated with the given menu. The control action(s) that are implemented based on the pressure sensing may be augmented as a function of the device's spatial orientation, e.g., as sensed by a device accelerometer, a gyroscope, or the like.

The foregoing has outlined some of the more pertinent features of the subject matter. These features should be construed to be merely illustrative.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
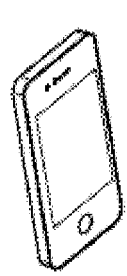
FIG. 1 is an exemplary mobile device in which the force-based user interface (UI) control method of the disclosure is implemented.
Figure 2:
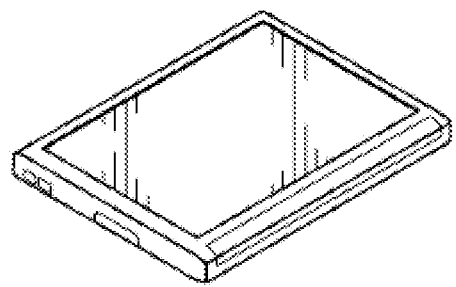
FIG. 2 is an exemplary tablet device in which the force-based UI control method may be implemented.

As described above, this disclosure provides a force- or pressure-based control method that is operative in a mobile computing device having a display with a curved surface. Typically, the curved surface is located along an edge of the display (or along all of the edges). The notion of "curved" is not necessarily limited to a particular physical structure; more generally, the display surface is non-linear. As will be described, at least a portion of the non-linear display surface is pressure- or force-sensitive, meaning that surface includes hardware elements that are adapted to sense applied force or pressure. According to this disclosure, the degree to which the user applies force or pressure to the curved surface of the device is then used as a control of the user interface itself. This technique provides significant advantages for a user, especially as the size of the device (and thus the display screen) increases, as is the case with next-generation devices, such as the Apple® iPhone® XS mobile device (or equivalent). Of course, the techniques described herein are not limited to any particular mobile device, only that the device includes a non-linear surface along at least some portion of the device. Typically, the device will have a sufficiently-large form factor such that it can be held and manipulated within the user's hand. FIG. 1 depicts a representative mobile device, and FIG. 2 depicts a representative tablet device, that incorporate the curved force-sensing display, and the associated control software, as will be described below.

In a representative embodiment, the mobile device is a relatively larger form factor smartphone or a relatively smaller form factor tablet, such as the iPhone® or iPad®, an Android™-based mobile device (Samsung® Galaxy®, Google® phone, etc.), or the like. These commercial products are not intended to be limited, as noted above.

Figure 3:
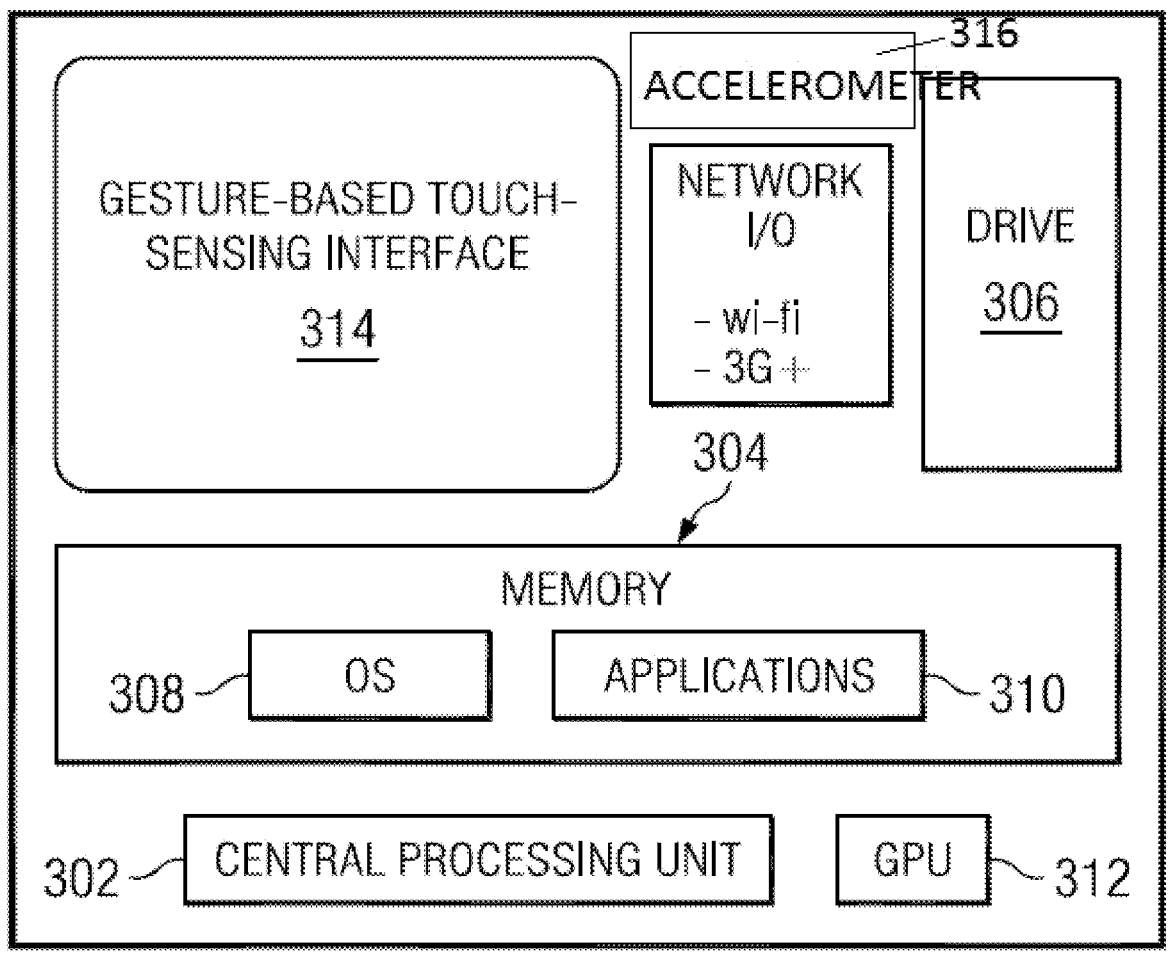
FIG. 3 illustrates representative hardware elements of the mobile device.

As seen in FIG. 3, a representative device 300 of this type comprises a CPU (central processing unit) 302, such as any Intel- or AMD-based chip, computer memory 304, such as RAM, and a drive 306. The device software includes an operating system (e.g., Apple iOS, Google® Android, Windows or the like) 308, and generic support applications and utilities 310. The device may also include a graphics processing unit (GPU) 312. In particular, the mobile device also includes a touch-sensing device or interface 314 configured to receive input from a user's touch and to send this information to processor 312. The touch-sensing device typically is a touch screen. The touch-sensing device or interface 314 recognizes touches, as well as the position, motion and magnitude of touches on a touch sensitive surface (gestures). In operation, the touch-sensing device detects and reports the touches to the processor 312, which then interpret the touches in accordance with its programming. Typically, the touch screen is positioned over or in front of a display screen, integrated with a display device, or it can be a separate component, such as a touch pad. The touch-sensing device is based on sensing technologies including, without limitation, capacitive sensing, resistive sensing, surface acoustic wave sensing, pressure (force) sensing, optical sensing, and/or the like. The touch-sensing can be based on single point sensing or multipoint sensing. Single point sensing is capable of only distinguishing a single touch, while multipoint sensing is capable of distinguishing multiple touches that occur at the same time. The touch-sensing can include actual contact of the touch-sensing device, near-touch of the touch-sensing device (e.g. detecting hovering), or remote detection of the user by the touch-sensing device.

In a representative embodiment, the display comprises a sensor array and associated software control routines to detect a touch input, as well as the degree of applied force or pressure. More generally, the sensors and associated software are configured to detect location and pressure. Display 310 preferably utilizes an array of sensors (i.e. a sensor grid) embedded in the display (or portions thereof). The touch sensitive display may be a self-capacitive or other type of touch sensitive display with an array of sensors for detecting the location of a touch across multiple sensors, as well as the amount of applied force or pressure. The touch sensitive display preferably generates a set of values relating to the amount of skin in direct contact with the display such as a set of values of detected capacitance by the sensor grid, as well as the amount of applied force or pressure. Different sensors may be used to sense touch and force.

The mobile device comprises suitable programming to facilitate gesture-based control, as will be further described.

Generalizing, the mobile device is any wireless client device having a form factor that includes a non-linear, pressure-sensing display (or other control) element. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular smartphone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The mobile device preferably includes a 3-axis accelerometer 316 that measures acceleration. Signals output from the accelerometer 316 indicate the orientation of the device, typically relative to fixed platform, such as the earth's surface. The mobile device may also include a gyro, which measures rate of rotation around a particular axis.

The mobile device software provides an operating system (or other application software) that receives and processes control signals generated from the user's interactions with the display.

Force-Based Gesture Control on a Mobile Device Having a Curved Surface

With the above as background, the technique of this disclosure is now described.

Figure 4:
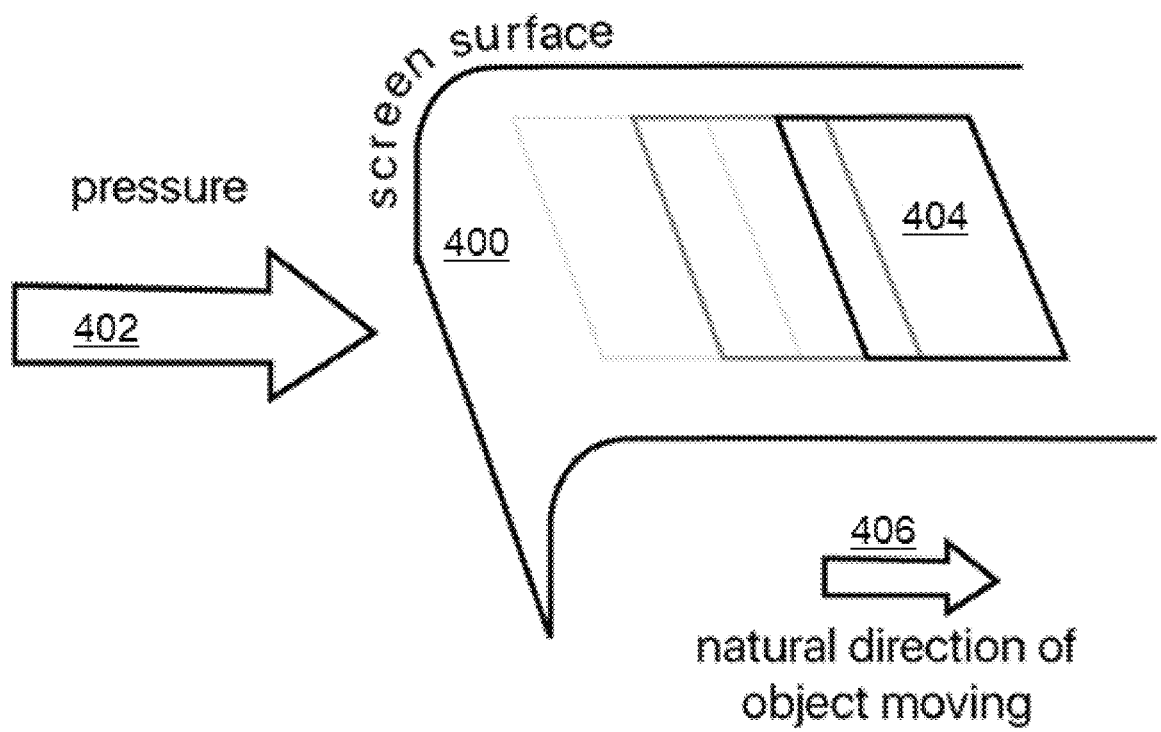
FIG. 4 depicts a portion of a mobile device display screen having a non-linear or curved surface and that responds to a force or pressure applied by a user.

FIG. 4 depicts a portion of a mobile device display having a curved surface 400. A force sensing element (or set of elements) underlines the screen surface 400, and that element (or elements) are adapted to receive an applied pressure 402, as indicated by the arrow. In this example, the pressure is applied normally and results in the movement of a display element 404 from left to right in the figure as the amount of pressure applied is increased. Preferably, the display element 404 is configured to move in the same general direction as the pressure being applied, as is shown by the arrow 406.

Figure 5:
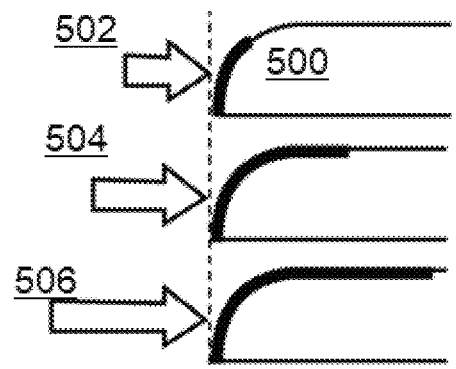
FIG. 5 depicts a basic operation showing how the degree of pressure applied by a user provides a given control function over a UI display element according to this disclosure.

The technique of this disclosure leverages this type of control as depicted in FIG. 5. In particular, FIG. 5 depicts the mobile device force- or pressure-sensing display surface 500 receiving varying degrees of applied pressure as depicted from top to bottom in the example. As the degree of pressure applied increases (as represented by arrows 502, 504 and 506, a UI element 508 starts to appear and then is exposed along a facing portion of the device. In this manner, the user applies pressure to the curved surface, selectively exposing more and more portions of the UI element as the pressure increases.

Figure 6:
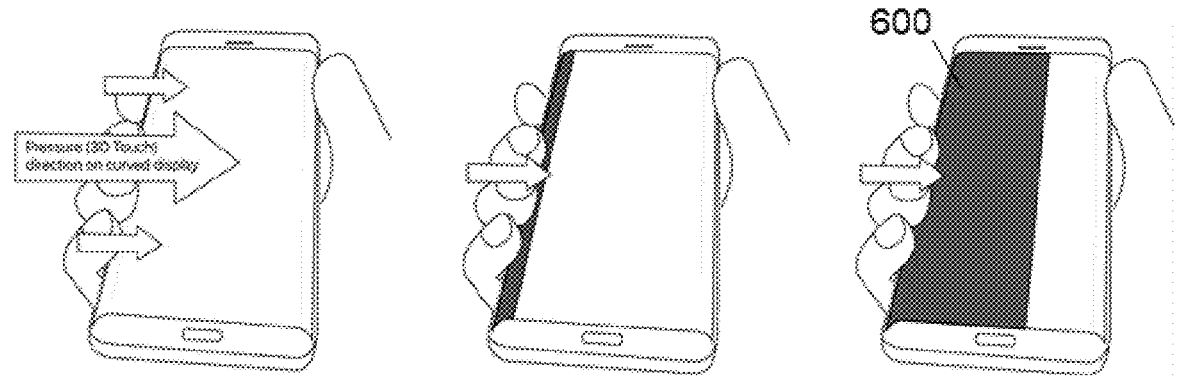
FIG. 6 depicts a first example control operation by which a user applies pressure to the curved display screen to effect opening of a display menu.

FIG. 6 depicts a representative, but non-limiting use case, in which the amount of applied pressure by the user controls the rendering of an application menu on the device display interface. In the left-most figure, the user holds the mobile device in his or her right hand (palm facing upwards); this is a typically operation, but it is not intended to be limiting. As the user applies an initial force to the device edge having the curved surface, that force is sensed by the force-sensitive display surface, and a corresponding user element (e.g., an application menu) 600 begins to appear. As the amount of force applied increases, the user element becomes more visible (see the middle figure), and additional portions of the user interface element become still more visible (see the rightmost figure) as applied pressure increases further. Preferably, when the degree of applied pressure (a given pressure level) is reached, the menu 600 remains at a then-current position, perhaps until some other action occurs (e.g., another control button or element is selected or pressed, or another action is initiated on another portion of the curved part of the display screen).

Generalizing, and as shown in FIG. 6, in operation the amount of pressure is sensed and converted into a set of one or more control signals, and these signals control the nature and extent of the interface element that is rendered on the device. While the example depicts how increasing the applied force alters the amount of the interface element that is rendered (visible) on the display, this is not a limitation. The amount of applied pressure may control some other aspect of the display element, such as its color, its display contrast, its movement (in whole or in part), or the like. Preferably, the manner in which the rendering of the particular interface element is controlled via the applied pressure is configurable, and may be system-, application- or user-dependent. How the user interface element is controlled may also be based on other factors, such as time-of-day, time since last user activity, etc.

Figure 7:
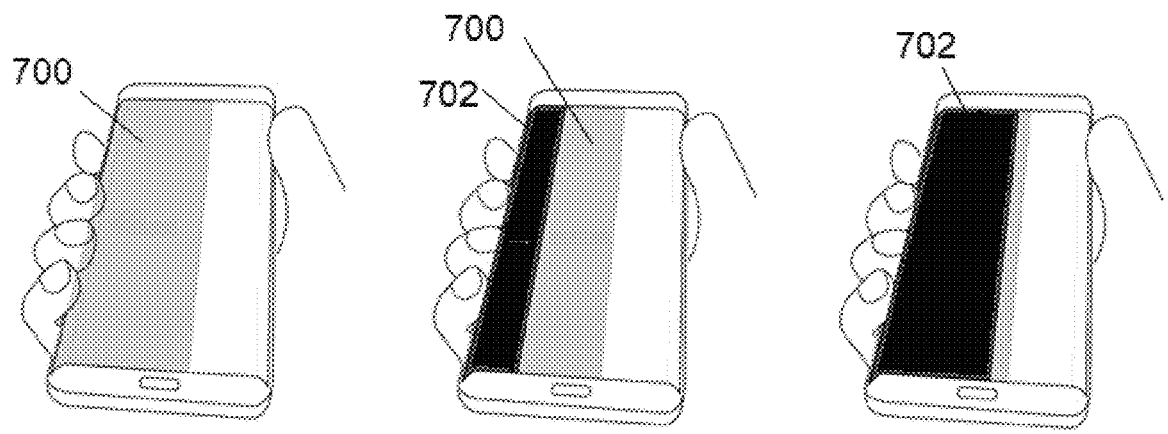
FIG. 7 depicts a second example control operation by which a user applies pressure to the curved display to control the opening of multiple display menus as the amount of pressure applied increases.

FIG. 7 depicts an alternative embodiment wherein the degree to which the user applies pressure causes the rendering of additional interface elements. Thus, in this example when the user first applies pressure (as depicted in the leftmost figure), a system menu 700 scrolls open and becomes visible. As additional pressure is applied (as depicted in the center figure) a second menu, such as an application menu 702, begins to open and overlays the system menu. When a given pressure is reached, the application menu 702 then remains persistent, such as shown in the rightmost figure.

Figure 8:
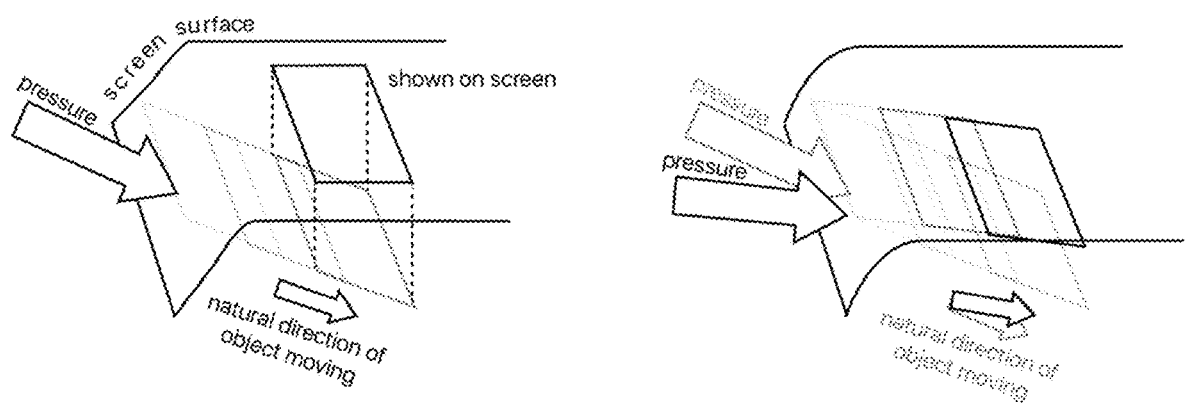
FIG. 8 depicts how a control operation may also be selectively altered as a function of an angle at which the mobile device is being held as determined by an accelerometer.

Thus, according to the technique herein, when a non-linear (curved) screen surface is pressed, i.e., receives an applied force, that force is sensed, converted to a control signal, and that control signal is then used to generate and control a user interface element, e.g., to move the element in a direction like a physical object would move. The degree of movement may also be impacted regardless of the orientation of the device itself, as depicted in FIG. 8. In this example, an orientation of the mobile device (as sensed by the device accelerometer) may also be applied to determine or otherwise influence the nature of the user interface element movement. In operation, the mobile device accelerometer generates position signals that are received, interpreted and stored as needed to reflect the position of the device, typically with respect to a fixed plane (such as a mobile device as it is positioned within the user's open palm). The accelerometer signals may be augmented with rotational signals generated by a gyro (if the device includes one). The outputs generated from the accelerometer (and gyro) provide movement and position information that is received by the force-sensing display routine. Generalizing, the movement and position information represents a physical movement of the device about any aspect of a three-dimensional (3D) space in which the device is being held by the user. Thus, the display routine may receive information (including pitch, roll, yaw, translation, up, down, shake, and combinations thereof) in any of six degrees of freedom. As noted above, such information (in combination with the pressure sensed from the display itself) causes a visual action to be presented to the user.

The approach herein is useful to control display elements in any mobile device (regardless of form factor) having a display screen that includes a force-sensing non-linear portion. As noted above, the portion may be located along an edge of the device, but more typically it (the curved portion) will be located along the entire edge (bezel) of the device. As the user holds the device naturally (typically in one hand as depicted in the example use cases in FIGS. 6-7), the user simply starts to press on the phone's side bezel, with the result that one or more user interface elements are automatically exposed and controlled, preferably based on the amount of pressure applied. The force-sensing curved screen display to show UI elements provided significant user benefits in terms of ease-of-use and control.

The above-described use cases are not intended to be limiting. In particular, and although the drawings illustrate various embodiments of how the pressure-based control and associated display operations may be carried out, other variants may be implemented. Indeed, these examples are merely illustrative of the overall concept, as other display operations and cues may be provided using other types of graphic elements, colorations, text, and combinations thereof. If desired, one or more visual elements may be combined with or substituted with an aural cue (e.g., a beep, a tone, or the like), e.g., based on the degree of applied pressure sensed on the curved surface.

The basic operation of the pressure-sensing display technique as described herein is implemented in software, as a series of program instructions that are compiled into executable form and executed in a processor in the mobile device. Preferably, and once configured, the display routine runs continually as a background process; in the alternative, the routine may be started upon a given occurrence such as initial turn-on of the device, within a given time, or following a user action to select the functionality.

As another alternative, the device may include a biometric sensor that is programmed to recognize a feature of the user's hand (or other physical characteristic) before the pressure-based control (from the curved surface) is accepted. This can provide an additional degree of security for the scheme. Another alternative is to couple the described scheme with an intelligent assistant (such as Apple Siri™), such that one or more voice-based commands must accompany the physical movements before the pressure-based control is enabled.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows.

The invention claimed is:

1. A mobile device, comprising:
   a force-sensing display screen having a non-linear portion;
   an accelerometer;
   a processor;
   a computer memory holding computer program instructions executed by the processor, the computer program instructions comprising program code configured to:
   receive pressure data from the force-sensing display screen;
   receive device orientation data as measured by the accelerometer;
   convert the received pressure data and the received device orientation data into one or more control signals; and
   use the one or more control signals to control an extent of exposure of an interface element with respect to a display interface as a function of both a pressure applied to the non-linear portion of the force-sensing display screen and on an orientation of the device, the interface element moving in a direction of pressure applied;
   wherein the interface element comprises at least first and second menus, and wherein the second menu is rendered as a sub-menu of the first menu as an amount of applied pressure, as represented by the pressure data received, increases, wherein the first and second menus move in a common direction and the second menu progressively overlays the first menu as the amount of applied pressure increases.

2. The mobile device as described in claim 1 wherein the pressure data varies as a function of an amount of applied pressure.

3. The mobile device as described in claim 2 wherein the program code is configured to expose and control a degree of movement of the interface element as an amount of applied pressure, as represented by the pressure data received, varies.

4. The mobile device as described in claim 1 wherein the first menu is a system menu and the second menu is an application menu.

5. The mobile device as described in claim 1 wherein the program code is configured to maintain the second menu in a fixed position on the display interface when a given applied force, as represented by the received pressure data, is reached.

6. The mobile device as described in claim 1 wherein the non-linear portion is curved.

7. The mobile device as described in claim 1 wherein the program code is further configured to control the exposure of the interface element based on a time since a last user activity.

8. The mobile device as described in claim 1 wherein the program code is further configured to control the exposure of the interface element based on a time-of-day.

9. The mobile device as described in claim 1 wherein the program code is further configured to adjust one of: a display color, and a display contrast, based upon the received pressure data.

10. The mobile device as described in claim 1 further including a biometric sensor, and wherein the program code is further configured to control the exposure of the interface element responsive to detection by the biometric sensor of a user physical characteristic.

* * * * *